US 6,622,739 B2

United States Patent
Rice et al.

(10) Patent No.: US 6,622,739 B2
(45) Date of Patent: Sep. 23, 2003

(54) METHOD AND APPARATUS FOR REMOVAL OF COATINGS AND OXIDATION FROM TRANSIT VEHICLES

(75) Inventors: Robert M. Rice, Huntsville, AL (US); James Fletcher Burgess, Huntsville, AL (US); Kirk E. McLauchlin, Madison, AL (US)

(73) Assignee: Advanced Systems Technologies, Inc., Huntsville, AL (US)

( * ) Notice: Subject to any disclaimer, the term of this patent is extended or adjusted under 35 U.S.C. 154(b) by 208 days.

(21) Appl. No.: 09/803,800

(22) Filed: Mar. 12, 2001

(65) Prior Publication Data

US 2002/0124868 A1 Sep. 12, 2002

(51) Int. Cl.⁷ .................................................. B08B 3/00
(52) U.S. Cl. ...................... 134/184; 134/134; 134/116; 134/119; 134/123; 134/129; 15/302; 405/53
(58) Field of Search ............................... 134/22.1, 22.11, 134/22.12, 22.18, 23, 24, 32, 33, 34, 10, 44–45, 47, 55, 65, 79, 103.1, 103.2, 104.2, 104.4, 123, 184–7, 129–131, 172, 132, 133, 151, 119; 15/302; 405/53

(56) References Cited

U.S. PATENT DOCUMENTS

| 557,799 | A | * | 4/1896 | Gorter .......................... 417/123 |
| 3,664,456 | A | * | 5/1972 | Smith et al. ................ 182/62.5 |
| 4,562,848 | A | * | 1/1986 | Messing et al. ............. 134/123 |
| 4,679,578 | A | * | 7/1987 | Miller .......................... 134/123 |
| 5,249,632 | A | * | 10/1993 | Sparling et al. ............... 169/52 |
| 5,421,517 | A | | 6/1995 | Knudson et al. .......... 239/225.1 |
| 5,482,212 | A | * | 1/1996 | Kobryn et al. .............. 239/227 |
| 5,577,293 | A | * | 11/1996 | Meredith et al. .............. 15/302 |
| 5,778,713 | A | | 7/1998 | Butler et al. ..................... 72/53 |
| 5,816,743 | A | * | 10/1998 | Schmitz, Jr. .................. 405/53 |
| 6,001,181 | A | * | 12/1999 | Bullen ........................ 118/679 |

\* cited by examiner

Primary Examiner—Randy Gulakowski
Assistant Examiner—Gentle E. Winter
(74) Attorney, Agent, or Firm—Norman Friedland

(57) ABSTRACT

An oxide and coating removal system includes a mobile gantry or transport system supporting an end effector and high energy waterjet rotating nozzles judiciously located relative to the surface of the vehicle and includes positioning mechanism for locating the nozzle discretely relative to the vehicle. An environmentally safe system serves to re-claim the effluent by removing the contaminated particles and returning the re-claimed water to the pumping system.

9 Claims, 4 Drawing Sheets

METHOD AND APPARATUS FOR REMOVAL OF COATINGS AND OXIDATION FROM TRANSIT VEHICLES

TECHNICAL FIELD

This invention relates to water jets and particular to water jets mounted on a mobile gantry or the like for removing coating and oxidation from transit vehicles.

BACKGROUND OF THE INVENTION

As one skilled in this technology appreciates, vehicles, such as trains, railcars, buses, shipping containers, trailers and the like, when treated for removal of oxidation and coatings these treatments are typically environmentally unsafe chemical, abrasive, scrubbing or mechanical processes. It is generally well known that these methods fail to completely de-coat and clean the surface and often are expensive and produce waste water and/or chemicals that require treatment or disposal.

There are a sundry number of waterjet mechanisms that are discussed in the literature, as for example, U.S. Pat. No. 5,421,517 granted to Knudson et al on Jun. 6, 1995 and entitled HIGH PRESSURE WATERJET NOZZLE; and U.S. Pat. No. 5,577,293 granted to Meredith et al on Nov. 26, 1996; and U.S. Pat. No. 5,778,713 granted to Butler et al on Jul. 14, 1998 entitled METHOD AND APPARATUS FOR ULTRA HIGH PRESSURE WATER JET PEENING. The earlier two patents being commonly assigned with this patent application to United Technologies Corporation directly or through a subsidiary as noted within the patent and the other patent is assigned to another company not associated with the assignee of this patent application. Essentially, these patents relate to nozzles for stripping the surface materials from a substrate or using high energy waterjet for working the surface of a material. In these types of mechanisms the nozzle operates over a relatively small surface and the surface or nozzle is moved to ultimately treat a larger surface. U.S. Pat. No. 5,421,517, supra, for example, describes a prior art waterjet system that is typically employed to remove for example the coatings applied to aircraft components, space vehicles used in outer space missions and the like. The high power waterjet nozzle of the type depicted in this patent includes mechanism for rotating a nozzle and when translated across a surface creates an array of jet streams discharging from orifices in a nozzle that defines a swath that is intended to uniformly strip the coating from the substrate. In particular an array of radially extended orifices located in the nozzle are dimensioned and located to define the amount of energy of the jet that provides the uniform stripping without incurring damage to the substrate.

The U.S. Pat. No. 5,577,293, supra, for example, discloses another high pressure waterjet nozzle capable of use for stripping coatings, paint and the like from substrates or components. The nozzle in the structure depicted in this patent includes radially spaced orifices that communicate with a source of high pressure water and the end effector supporting the nozzle is gimbal mounted to provide the desired motion of the nozzle and hence, the swath of highly energized jet stream developed by the nozzle.

The U.S. Pat. No. 5,778,713, supra, for example, discloses a nozzle with a single orifice that serves to discharge ultrahigh velocity waterjet that is utilized for peening the outer surface of an object so as to alter the properties of the material by localized compression and altering the crystal structure.

This invention is not an automobile cleaning type of power unit that is mounted on a fixed structure or mobile gantry or a combination thereof, that cleans/waxes the surface of automobiles by spraying a liquid detergent and gently brushing the automobile and then, applying heat to dry the surface. In these mechanisms, a relatively low pressure water is ejected from a nozzle and the automobile is typically pulled by a motorized pulley or track through an array of nozzles and a brush is mounted on a gantry that rides over the automobile. Heating mechanism is associated with this mechanism for drying purposes.

This invention is more concerned with the removal of oxidation and coatings that are securely affixed to the surface of the vehicle and which coatings are typically difficult to remove and for that reason this invention contemplates utilizing high energy water spray which has never been utilized for this purpose. According to this invention the de-coating and/or de-oxidizing is accomplished with a transporter device, such as a mobile gantry with multiple spray heads with specialized water jetting nozzles being fed from a high pressure water pump(s), having operator control mechanism and employing mechanism for treatment of the effluent materials. Transport mechanism is judiciously employed to align the nozzles in a particular relationship with the surface intended to be de-oxidized or/and de-coated. As will be discussed in more detail hereinbelow, this invention treats the entire vehicle at one time eliminating the time consuming and costly processes that have been heretofore employed.

SUMMARY OF THE INVENTION

An object of this invention is to provide high energy waterjet mechanism operating over a relatively large surface for removing oxidizing or coatings from a vehicle such as a train, railcars, trucks, buses, shipping containers, trailers, and the like.

A feature of this invention is to mount a plurality of movable nozzles movable relative to its support mechanisms on a transport mechanism or mobile gantry and supply a high energy water stream to the nozzles to produce a waterjet for removing oxides and coatings from a vehicle.

Another feature of this invention is to mount the movable nozzles on a mobile gantry or the like and include motorized mechanism such as a ball screw actuator to position the nozzle relative to the surface intended to be de-oxidized and/or de-coated.

Another feature of this invention to provide an improved waterjet oxide and coating removal system from a vehicle having control mechanism to control the relative distance of the nozzle from the surface of the vehicle, to position the gantry, and control the system from a control panel.

Another feature of this invention is the provision of mechanism for capturing the effluent materials at the surface or in the facility where the treatment occurs and transporting the waste to a treatment center where the particles are removed in an environmentally safe atmosphere and manner.

The foregoing and other features of the present invention will become more apparent from the following description and accompanying drawings.

These figures merely serve to further clarify and illustrate the present invention and are not intended to limit the scope thereof.

DETAILED DESCRIPTION OF THE INVENTION

While this invention is shown in its preferred embodiment for removing oxides and coatings from the substrate of a railcar and bus it should be understood that this invention is contemplated for use in the removal of other substances, as for example graffiti that is placed on the surface by different materials, and for use on other types of vehicles that may require different nozzle and gantry configurations.

Figure 1:
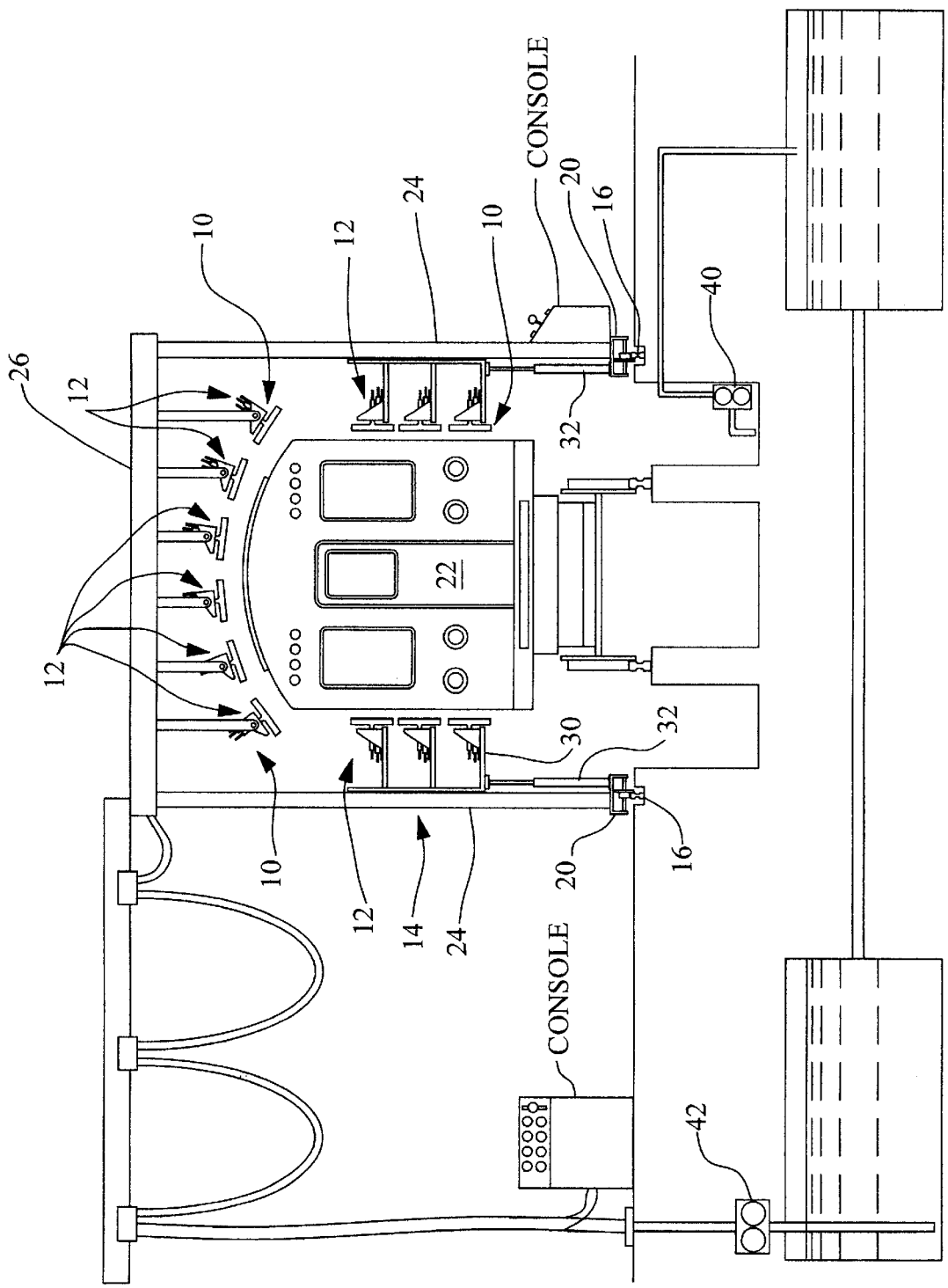
FIG. 1 is a schematic illustration of this invention.
Figure 2:
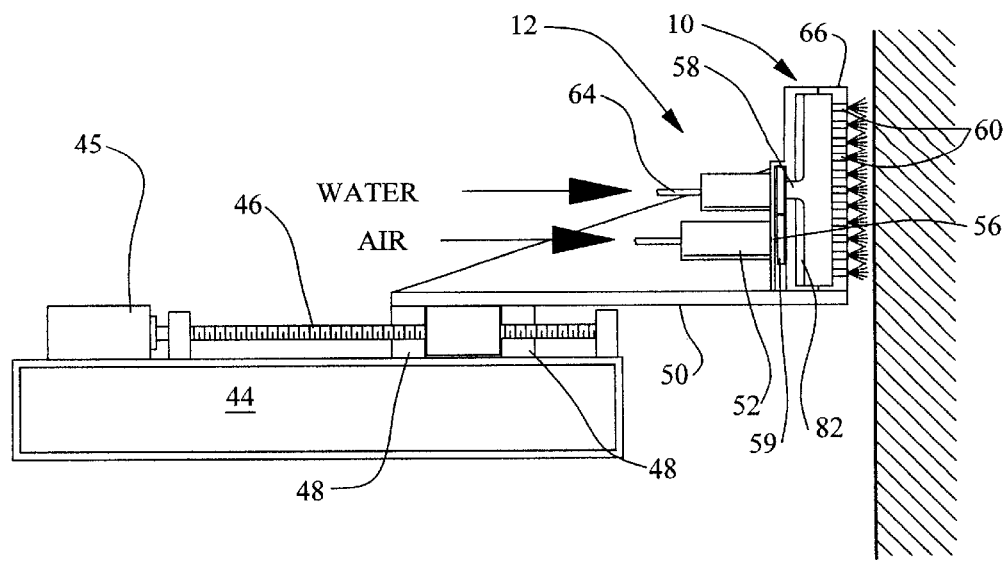
FIG. 2 is a side view in elevation of the end effector with the movable nozzle for delivering a high energy waterjet to the vehicle intended to be treated with a portion of the shroud removed for view of the nozzle.

The invention can best be seen by referring to FIGS. 1 and 2 showing the high pressure waterjet nozzles generally illustrated by reference numeral 10 being supported by the end effector generally illustrated by reference numeral 12 which in turn is supported to the frame of the transport or mobile gantry 14. The gantry 14 is supported to and rides on track or guide rail 16 via the wheel 18 that is rotated by a commercially available variable speed motor 20. As is apparent from the Figs. the gantry traverses the rail and moves horizontally and parallel to the vehicle 22 being treated and carries the opposing vertical frame members 24 and the connecting bridge member 26.

The end effectors 12 mounted on the opposing sides of vehicle 22 are mounted on a vertical platform 30 that is supported to a guide rail affixed to the frame 24. Air cylinder 32 supported on the gantry serves to position the platform 30 and hence the group of three or bank of nozzles 10 and end effectors 14 traverses vertically with respect to the vehicle 22. Obviously, other types of actuators, such as hydraulic or electrical can be utilized in place of the air cylinder 32). The bridge 26 supports a plurality of nozzles 10 and end effectors 12 to treat the top of vehicle 22. The electric cables, water and air hoses are suitably mounted in the frame in a well known manner and for the sake of convenience and simplicity, these details are not shown herein as one ordinarily skilled in this art would predicate the routing of these hoses and cables on the particular configuration of the waterjet treatment system being employed. A suitable and well known control console with the appropriate switches and control knobs or handles is contemplated for controlling the delivery of air, electrical and water mediums from the respective sources for movement and/or rotation of the various systems components.

It is apparent from the foregoing and FIG. 1 that the vehicle being treated is placed in a treatment facility or garage and is supported over a well or maintenance pit where the effluent water and debris is collected. The pump 40 serves to remove this contaminated water from the pit and flow it to a treatment facility where the contamination is removed and the water is reclaimed for re-use in the waterjet system. The treated water and/or supplemental well or tap water is pressurized via pump(s) 42 to say 40,000 pounds per square inch (PSI) for return to the waterjet nozzles 10. Obviously, because of the manner in which the vehicle is treated and the waste water collected, this invention lends itself to treating the effluent in an efficacious way so that the effluent is transported to a treatment system for removing the particles and contaminants in an environmentally safe manner.

The details of the nozzle 10 and end effector 12 can best be seen by referring to FIG. 2 where the end effector 12 is suitably mounted on base member 44 supporting a suitable commercially available electric motor 45 driving a suitable commercially available ball drive assembly 46 that is rotary supported to the load bearing blocks 48 supported, in turn, to the base member 44 for rectilinearly translating the end effector 12 and nozzles 10 horizontally with respect to vehicle 22. The triangular shaped support member 50 of the end effector 12 carries a suitable air driven motor 52 which, in turn, rotates the motor shaft 56 via gear 59 for transmitting rotary motion to the nozzle 10 via shaft 58 supported to a commercially available swivel connection for rotating nozzle 10. Nozzle 10 comprises a plurality of orifices 60 axially facing the target and each orifice is fluidly connected to the nozzle's manifold 62 for ejecting the waterjet onto the surface of the vehicle being treated. The orifices 60 may be removable so that different aperture sizes can be replaced depending on the particular application of the removal mechanism. High pressure water, at say 40,000 PSI, is supplied to manifold 62 via the high pressure hose 64 that is suitably connected to the hollow shaft 58. A shroud 66 surrounds the orifices 61 of nozzle 10 to contain the plume of water being ejected from the orifices 60.

Figure 3:
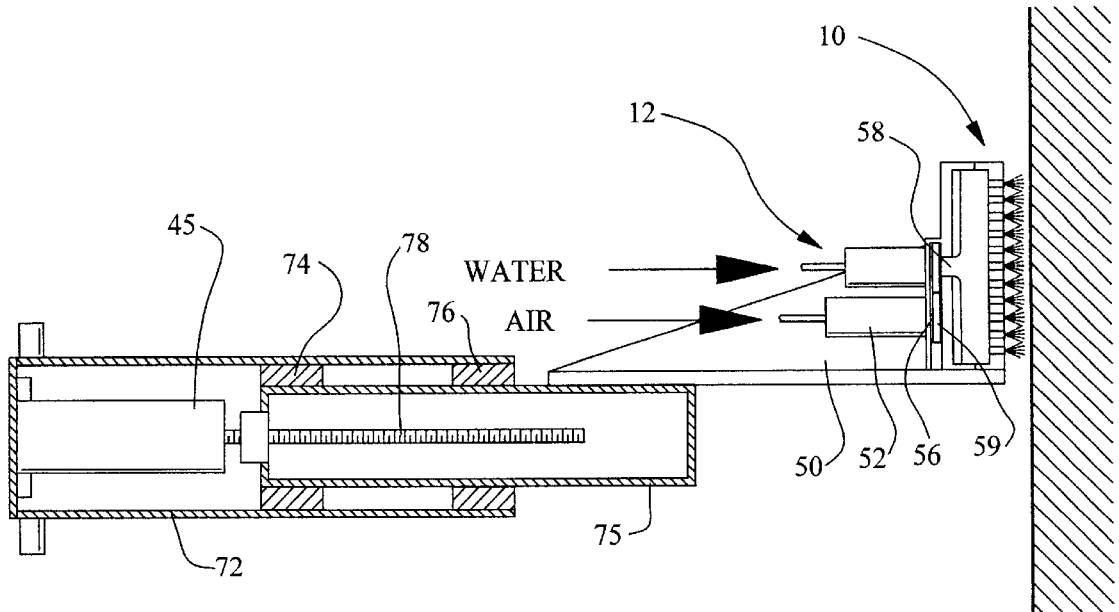
FIG. 3 is another embodiment of the end effector and nozzle illustrating another configuration for effectuating movement of the end effector.

FIG. 3 illustrates another configuration for positioning the end effector 12 and nozzle 10 noting that the duplicate reference numerals represent the same or similar elements in all of the Figures. In this embodiment, the electric motor 45 which drives the commercially available ball drive 70 is mounted in the rectangularly shaped housing 72. A similarly shaped but smaller rectangular member 75 is supported in housing 72 by the sliding bearings 74 and 76, where bearing 74 is attached to the outer surface of inner rectangular member 75 and bearing 76 is attached to the inner surface of housing 72. As is apparent from the foregoing the actuation of motor rotates shaft 78 for translating the member 75 rectilinearly and, in turn, positioning the end effector 12 and nozzle 10 relative to the target. Similar to the embodiment in FIG. 2, the triangularly shaped support 50 supporting end effector 12 includes the air motor 52 driving gear 80 which, in turn, drives the driven gear 82 for rotating the swivel connector 84 for rotating the nozzle 10.

In operation, the vehicle is parked in the appropriate position in the maintenance pit and the operator actuates the system by pressing the appropriate button or switch in the control console. The gantry is moved to the starting position and the air, water and electrical utilities are actuated to provide the necessary water, air and electrical power to the system. The water and air pumps are actuated to generate the desired air and water pressures and the operator can then initiate the treatment process. The vertical waterjet nozzles are raised and lowered to the required position and then the gantry is translated horizontally. The rotating nozzles at some point in time in the beginning of the process are positioned via the ball drive relative to the surface of the vehicle and the system continues to operate until the treatment is completed. The nozzles may be repositioned during the operation, as required, either manually or by the use of well known and commercially available position sensors, not shown. Obviously, the effluent is removed from the pit and transported to the treatment center where it is treated and returned to the waterjet system.

Figure 4:
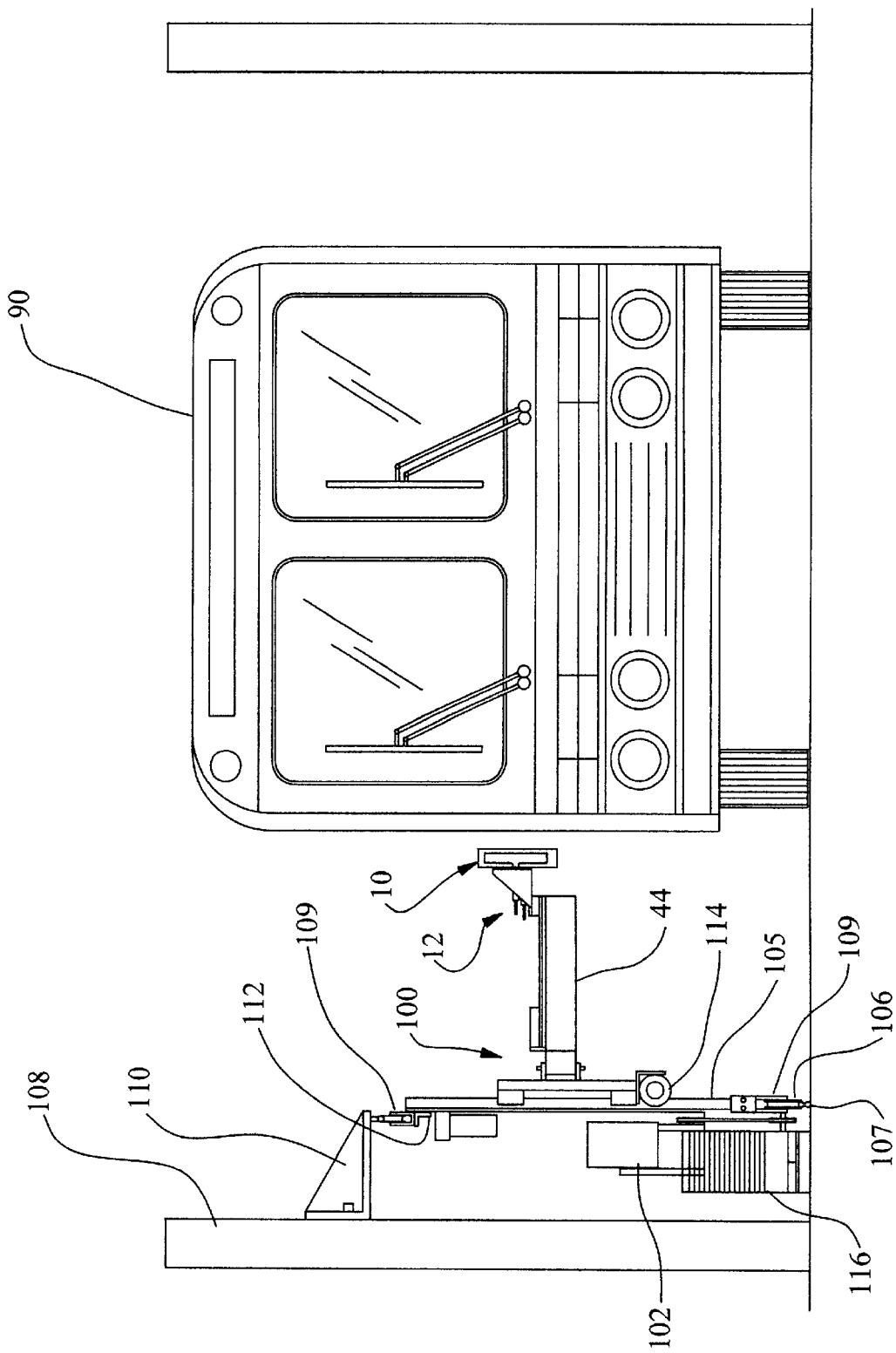
FIG. 4 exemplifies another embodiment of this invention where a less sophisticated system is shown for treatment to the side portion of the vehicle.

FIG. 4 exemplifies another embodiment of this invention illustrating the removal equipment mounted on the wall within the area where a vehicle is being treated, and in this instance, the vehicle is bus 90. The nozzle and end effector in this embodiment can be identical to the nozzle 10 and end effector 12 described in the embodiment disclosed in FIGS. 2 and 3. In this embodiment a rack and gear configuration generally illustrated by reference numeral 100 is utilized to provide the vertical movement of base member 44. Horizontal movement, i.e. movement in and out of the paper as viewed in the Figs.) Is provided by a suitable well known and commercially available variable speed motor shown in blank as 102, which drives wheels 109 on track 107 via a set of gears or chains and sprockets. The toothed rack 105 is supported to the vertical support 112, which in turn, is supported to wheels 109 which ride on bottom track 107 mounted on the floor by the leg 106 and is also supported to the upper track 109. The vertical support 112 is supported to wall 108 by bracket 110. The commercially available motor and driven gear assembly shown generally by reference numeral 114 serves to position the base 44 and obviously the vertical position of the end effector 12 and nozzle 10. The hose and cable (not shown) are supported in the carrier 116 and moves with the vertical support 112 and the motor assembly 102. Obviously, any well known suitable controls, preferably mounted in a console, can be utilized to control the various mediums utilized in this system. It is apparent from the foregoing, in this embodiment the nozzle is positioned vertically and horizontally to treat one side of the bus. It is contemplated within the scope of this invention that multiple nozzles and end effectors can be utilized and an identical system can be mounted on the other side of the bus in the event that it is desirous to treat both sides of the bus at the same time.

Figure 5:
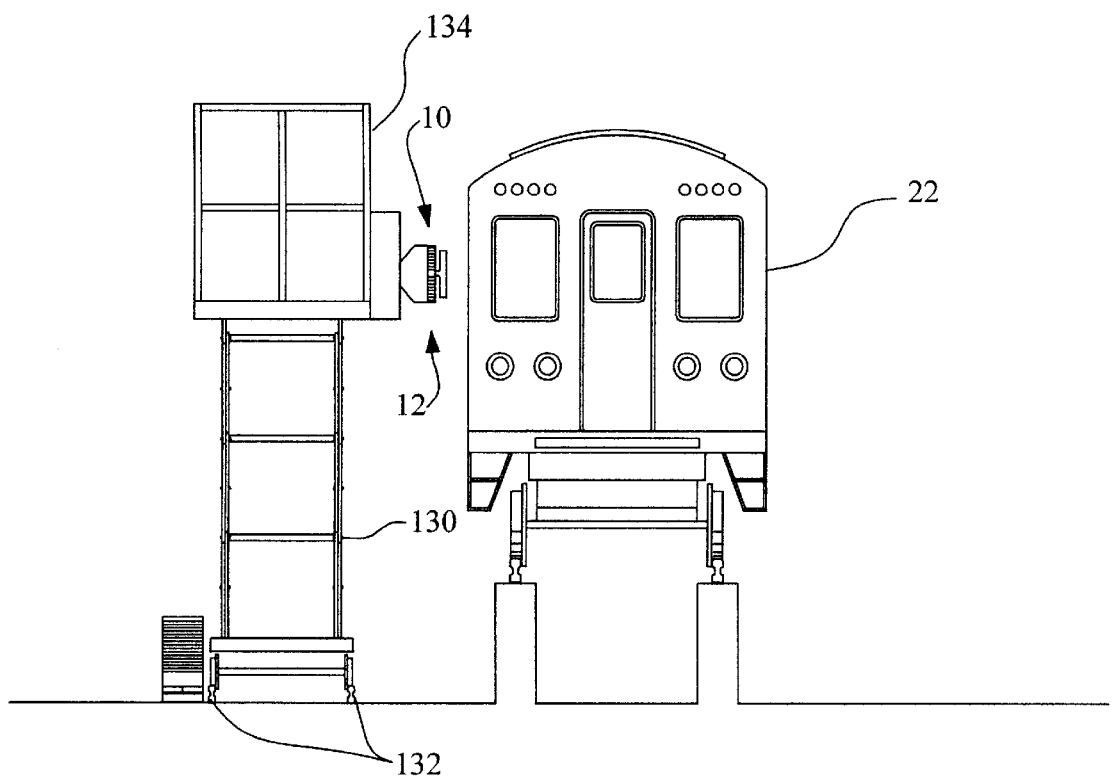
FIG. 5 is a view in elevation of another embodiment exemplifying this invention.

FIG. 5 exemplifies another embodiment for treatment of, for example, a rail car utilizing a well known and commercially available scissor lift 130 that is suitably mounted on the parallel tracks 132 for positioning the scissor lift 130 and personnel carrier 134 horizontally relative to the vehicle 22. The end effector and nozzle are identical to the configuration depicted in FIGS. 2 and 3 and it likewise may include the mechanism for moving the end effector 12 and nozzle 10 horizontally relative to the vehicle 22. Similar to FIG. 4 the cable and hoses are mounted in carrier 116 which is mounted on a track to move with the scissor lift 134.

What has been shown by this invention is a complete self-contained oxide and coating removal treatment system for a vehicle and which system is a continuous operation and once, initiated the system is automatic or alternatively can be controlled by the operator to provide a sequential and continuous operation and is characterized as being relatively simple to operate, efficacious and relatively inexpensive in terms of time required for treatment of the vehicle. The system lends itself to purify the waste water in an environmentally clean atmosphere.

Although this invention has been shown and described with respect to detailed embodiments thereof, it will be appreciated and understood by those skilled in the art that various changes in form and detail thereof may be made without departing from the spirit and scope of the claimed invention.

We claim:

1. A self-contained system for removal of oxides, coatings and the like from the surface of a vehicle including a transporter, at least one end-effector mounted on said transporter, said end effector including an outer casing defining a cavity, a bank of water jet nozzles supported by said end effector in said cavity and said bank of nozzles being disposed adjacent to said surface of said vehicle, motorized mechanism on said support and operatively connected to said end effector for positioning said end effector relative to said vehicle such that each water jet nozzle of said bank of water jet nozzles is mounted on the aft end of said end effector and being located between the end effector and the surface of said vehicle to be positioned relative to the surface said vehicle, additional motorized mechanism on said end effector operatively connected to said bank of nozzles for imparting rotary motion thereto, and a water supply system including pumping means and conduit means for leading pressurized water to each of said nozzles for ejecting high pressure water onto the surface of said vehicle, and means for positioning said transporter whereby the nozzle ejects high pressure water over a predetermined surface of the vehicle.

2. A self-contained system for removal of oxides, coatings and the like from the surface of a vehicle as claimed in claim 1 wherein said motorized mechanism is an electric motor driven ball drive.

3. A self-contained system for removal of oxides, coatings and the like from the surface of a vehicle as claimed in claim 2 wherein said additional motorized mechanism is an air motor.

4. A self-contained system for removal of oxides, coatings and the like from the surface of a vehicle as claimed in claim 1 wherein said transporter includes a mobile gantry, parallel tracks on the floor parallel to the transit vehicle and spaced therefrom for supporting said mobile gantry for movement from the fore end to rear end of the transit vehicle, said mobile gantry having at least one base member mounted thereon and supported to and for vertical movement of said mobile gantry, and said base supporting said end effector for horizontal movement relative to the position of said transit vehicle.

5. A self-contained system for removal of oxides, coatings and the of a vehicle as claimed in claim 2 including a bank of base members vertically spaced and supported to said gantry for vertical movement, each of said bank of base members including an end effector and a bank of nozzles and said gantry including a bridge supporting a plurality of end effectors and bank of nozzles over the top surface of said transit vehicle.

6. A self-contained system for removal of oxides, coatings and the like from the surface of a vehicle as claimed in claim 1 wherein said transporter includes a wall supported movement means for positioning said end effector and said bank of nozzles horizontally and vertically relative to surface of said transit vehicle.

7. A self-contained system for removal of oxides, coatings and the like from the surface of a vehicle as claimed in claim 6 wherein said transporter includes at least one rack and gear (assemblies) assembly supported to said end effector.

8. A self-contained system for removal of oxides, coatings and the like from the surface of a vehicle as claimed in claim 6 wherein said transporter includes at least one rack and gear assembly and at least one wheel and track assembly supported to said end effector.

9. A self-contained system for removal of oxides, coatings and the like from the surface of a transit vehicle as claimed in claim 1 wherein said transport includes a scissor lift, means for positioning said scissor lift from front to end of said transit vehicle and means to raise and lower said scissor lift, and a support attached to said scissor lift for supporting said end effector and said bank of nozzles for positioning said bank of nozzles relative to surface of said transit vehicle whereby the water ejected from each of said nozzles from said bank of nozzles removes said oxide and/or coating.

* * * * *